(12) United States Patent
Ennis (10) Patent No.: US 8,511,326 B1
(45) Date of Patent: Aug. 20, 2013

(54) TANK SYSTEM FOR PRODUCING BUBBLES AND ILLUMINATING THE BUBBLES AS THEY FALL FROM THE TANK ONTO A PASSING VEHICLE

(71) Applicant: G. Thomas Ennis, Inglewood, CA (US)

(72) Inventor: G. Thomas Ennis, Inglewood, CA (US)

(*) Notice: Subject to any disclaimer, the term of this patent is extended or adjusted under 35 U.S.C. 154(b) by 0 days.

(21) Appl. No.: 13/801,600

(22) Filed: Mar. 13, 2013

Related U.S. Application Data (63) Continuation-in-part of application No. 12/655,328, filed on Dec. 29, 2009.

(60) Provisional application No. 61/613,612, filed on Mar. 21, 2012.

(51) Int. Cl.
*B08B 3/04* (2006.01)

(52) U.S. Cl.
USPC .............................. 134/113; 134/123; 134/198

(58) Field of Classification Search
USPC .................. 134/113, 123, 198, 199; 15/53.1, 15/53.3, DIG. 2
See application file for complete search history.

(56) References Cited

U.S. PATENT DOCUMENTS

| | | | |
|---|---|---|---|
| 3,035,293 A | 5/1962 | Larson | |
| 3,339,563 A | 9/1967 | Ordonez | |
| 4,035,862 A | 7/1977 | Ennis | |
| 4,441,226 A | 4/1984 | Hanna | |
| 4,777,688 A | 10/1988 | Seamster | |
| 5,076,202 A | 12/1991 | Falls | |
| 5,076,304 A | 12/1991 | Mathews | |
| 5,432,974 A | 7/1995 | Yasutake et al. | |
| 5,709,002 A | 1/1998 | Belanger et al. | |
| 5,813,077 A | 9/1998 | Belanger et al. | |
| 5,853,494 A | 12/1998 | Andersson | |
| 7,494,547 B2 | 2/2009 | Peterson et al. | |
| 7,681,274 B2 | 3/2010 | Belanger | |
| 2006/0011223 A1 | 1/2006 | Peterson et al. | |
| 2008/0040882 A1 | 2/2008 | Duterme | |
| 2011/0197924 A1* | 8/2011 | Belanger et al. | 134/18 |
| 2011/0277792 A1* | 11/2011 | Turner et al. | 134/18 |
| 2013/0032183 A1* | 2/2013 | Belanger | 134/57 R |

OTHER PUBLICATIONS

U.S. Appl. No. 12/655,328, Non-Final Rejection, Jun. 13, 2013.
U.S. Appl. No. 12/655,328, Non-Final Rejection, May 31, 2012.
Letter from Quinn Law Group of Alleged Relevance of US Patent No. 3,035,293 to U.S. Appl. No. 12/655,328.
U.S. Appl. No. 12/655,328, Notice of Allowance, Feb. 21, 2013.

* cited by examiner

*Primary Examiner* — Saeed T Chaudhry
(74) *Attorney, Agent, or Firm* — Risso & Associate (57) ABSTRACT

A tank system is described for dropping fluid onto a passing vehicle. The tank system includes a tank with a fluid supply inlet. Optionally, a soap injector is included for injecting soap into the water flow to create a fluid mix that is supplied to the tank. A lighting system is attached to the tank. The fluid mix, or any other chemical in the tank, may be heated with the heating unit. An air motor is included for providing air to an air manifold that is disposed within the tank. When air is introduced into the fluid mix, bubbles are created. As the fluid mix and bubbles fill the tank, they fall from the tank via an overflow lip, with the fluid mix and/or bubbles being illuminated by the lighting system as they fall onto a vehicle passing below.

14 Claims, 13 Drawing Sheets

TANK SYSTEM FOR PRODUCING BUBBLES AND ILLUMINATING THE BUBBLES AS THEY FALL FROM THE TANK ONTO A PASSING VEHICLE

CROSS-REFERENCE TO RELATED APPLICATIONS

This is a Continuation-in-Part application of U.S. Non-Provisional application Ser. No. 12/655,328, filed on Dec. 29, 2009, entitled, "Bubble tank system." This application is ALSO a non-provisional application of U.S. Provisional Application Ser. No. 61/613,612, filed on Mar. 21, 2012, and entitled, "Bubble Tank System For Producing Bubbles And Illuminating The Bubbles As They Fall From The Tank To Simulate Falling Lava On A Passing Vehicle."

BACKGROUND OF THE INVENTION (1) Field of Invention

The present invention relates to a bubble tank and, more particularly, to a bubble tank system for generating bubbles and illuminating the bubbles as they fall from the bubble tank onto a passing vehicle.

(2) Description of Related Art

Vehicle washing systems have long been known in the art. By way of example, automatic vehicle-washing systems are well-known and are in widespread use for washing passenger automobiles, trucks, buses, railroad equipment, and the like. A typical system includes a conveyor for moving the vehicle through the installation, and a series of power-driven brushes which are moved around the vehicle under a drenching spray of water and soap or detergent to remove dirt and grease. The washed vehicle is given a spray of clean rinse water, and is then moved to a drying station.

While such drenching spray systems are operable for introducing soap and water to a passing vehicle, they require multiple spray heads, each of which is prone to breakage and maintenance. Additionally, typical spray heads introduce a low volume to the passing vehicle and, therefore, are operated under high pressure to be effective. Further, due to the pumps that are required to operate such spray systems, traditional drenching spray systems utilize a lot of electricity and are otherwise not environmentally sensitive. Such spray systems do not evenly distribute the solution as any distribution is largely limited to the location and reach of the spray heads. Finally, typical spray systems do not include unique light systems that provide for a variety of lighting effects.

Thus, a continuing need exists for an environmentally sensitive system for introducing a relatively large volume of soap and water (i.e., bubbles) to a passing vehicle without the need for multiple, high-pressure spray heads. A need also exists for a system that illuminates the bubbles as they fall from the system onto the passing vehicle to provide for a variety of lighting effects.

SUMMARY OF INVENTION

While considering the failure of others to make and/or use all of the above factors/ingredients/steps/components in this technology space, the inventor unexpectedly realized that a bubble tank system can be employed to introduce a large volume of water, soap, and bubbles to a passing vehicle without the need for multiple high-pressure spray heads and, thereby provide for an even distribution of water, soap, etc., to the passing vehicle.

Further, when illuminating the bubbles as they fall from the tank system, it was unexpectedly realized that the bubbles provide the appearance of actual lava. Thus, in addition to being a bubble tank system, the present invention is also directed to a bubble tank system for generating bubbles and illuminating the bubbles as they fall from the bubble tank onto a passing vehicle.

The system includes a tank having a trough portion and an overflow lip of any desired width (e.g., that is at least as wide as a passing vehicle). A support system is connected with the tank for elevating the tank above a ground surface to allow a vehicle to pass beneath the tank. A fluid supply inlet is fluidly connected with the trough portion of the tank for receiving a fluid flow from an external fluid source and introducing fluid into the tank. Further, a light system is attached with the tank. The light system includes a light element to direct light toward a fluid as it falls from the tank, whereby upon receiving fluid, the trough portion collects the fluid until the fluid reaches the overflow lip, at which point the fluid flows over the overflow lip and falls from the tank onto a passing vehicle, such that upon falling from the tank, the fluid is illuminated by the light system.

In another aspect, the tank system includes a soap injector fluidly connected with the fluid supply inlet for injecting soap into the fluid flow to create a soap mix that is supplied to the tank. In this aspect, an air manifold is positioned in the trough portion of the tank. Additionally, an air motor is fluidly connected with the air manifold to introduce air through the air manifold and into the soap mix, whereby upon receiving the soap mix and air, bubbles are created that fill the tank until reaching the overflow lip, at which point the bubbles and soap mix flow over the overflow lip and fall onto a passing vehicle.

In yet another aspect, the light element includes a plurality of light emitting diodes (LEDs) such that light emitted from the LEDs is directed toward the fluid falling from the tank. In another aspect, the light system includes a front signage.

In another aspect, the light element includes multi-colored LEDs that are directed downward to illuminate a falling fluid, such that when the falling fluid is illuminated by the multi-colored LEDs, the falling fluid simulates the appearance of falling lava.

In yet another aspect, the tank system includes a heating system for heating the fluid within the tank. The heating system further comprises a heating element to heat the fluid; a temperature sensor to sense the temperature of the fluid; a temperature switch to control the operability of the heating element; and a low liquid level switch to turn off the heating element if the fluid in the tank falls below a predetermined threshold.

In another aspect, a curtain is attached with the tank such that it hangs from the tank proximate the overflow lip.

Additionally, a mechanical float valve is operably connected with the fluid supply inlet. The float valve is adapted to close upon the fluid exceeding a predetermined level within the tank and to open upon the fluid falling below the predetermined level.

In another aspect, the tank includes two troughs with a drop opening positioned therebetween, such that each trough includes an air manifold.

In another aspect, the external fluid source includes wax, chemicals, soap, water, or any combination thereof. For example, if wax, when in the tank, the heating system heats the wax to generate a hot wax that falls from the tank onto a passing vehicle.

Finally, as can be appreciated by one in the art, the present invention also comprises a method for forming and using the tank system described herein. The method comprises a plurality of acts of forming and operating the tank system.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) DESCRIPTION

Figure 1:
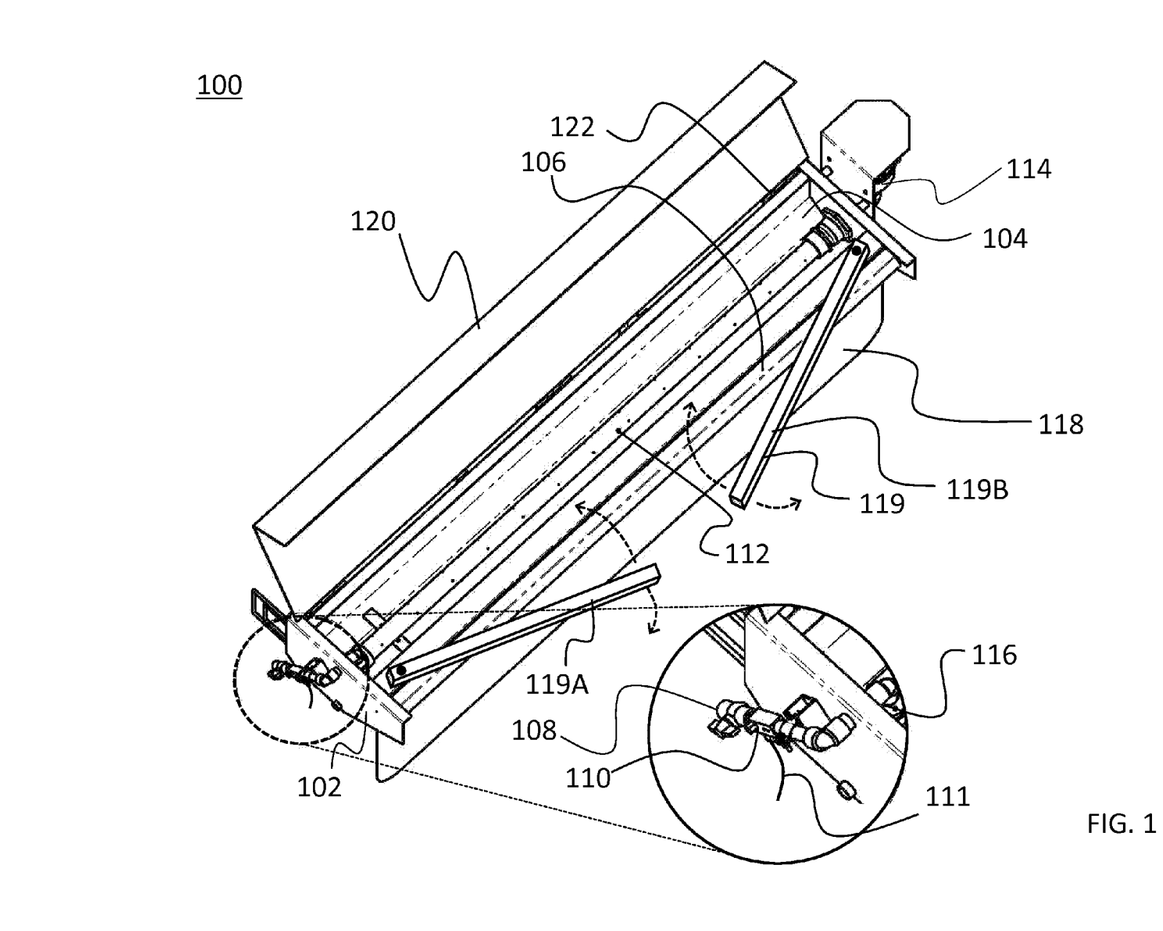
FIG. 1 is an elevated, perspective-view illustration of a bubble tank system according to the principles of the present invention.

As shown in FIG. 1, the present invention is a bubble tank system 100 that provides an improvement over the prior art by using a tank 102 to collect water and a soap mix (or any other fluid), which then overflows to provide a gravity-fed waterfall that dumps a relatively large volume of water and bubbles (and/or other fluids, e.g., wax) onto a passing vehicle.

In this aspect, the bubble tank system 100 includes a tank 102 having a trough portion 104 and an overflow lip 106. The trough portion 104 acts as a trough to collect water (and/or other fluids) that is introduced into the tank 102 from a supply inlet 108 (e.g., water supply and/or chemical, wax, etc). The supply inlet 108 is fluidly connected (e.g., via piping) with the trough portion 104. In operation, the supply inlet 108 receives fluid (e.g., water) from an external source and introduces the fluid into the tank 102 where it gathers in the trough portion 104. It should be understood that although the system as described uses water, the present invention is not intended to be limited thereto as it can be used with any fluid and/or fluid source. Thus, the supply inlet 108 is, in its broadest form, a fluid supply inlet, with water being but one non-limiting example. Other non-limiting examples of which include wax, chemicals, soap mix, etc.

Figure 7:
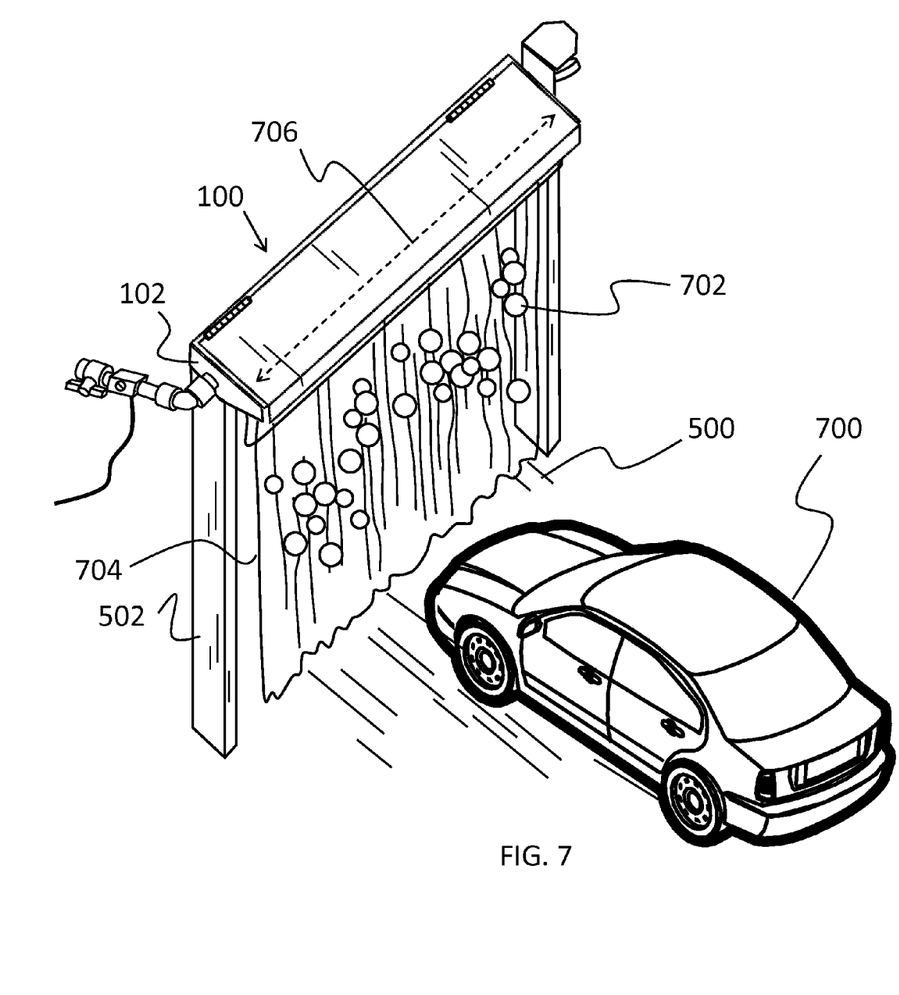
FIG. 7 is an elevated, perspective-view illustration of the bubble tank system, depicting the system in operation.

Upon receiving water, the trough portion 104 collects the water until the water level reaches the overflow lip 106, at which point the water flows over the overflow lip 106 and falls from the tank 102 onto a passing vehicle (as depicted in FIG. 7). The overflow lip 106 is approximately level or at an angle, or undulated across its entire width. For example, if level, the water flowing over the overflow lip 106 will not gather and drain at one side or point and, instead, will fall evenly from the overflow lip 106. Alternatively, if formed at an angle or with undulations, the water falls from the tank according to the angle or shape of undulations.

In addition to providing water (or wax, etc.) onto a passing vehicle, the present invention provides soap and bubbles to said vehicle. The soap or any other chemicals can be added to the fluid in the tank 102 using any suitable mechanism or device. As a non-limiting example and as depicted in FIG. 1, a soap injector 110 is fluidly connected with the water supply inlet 108 for injecting soap (from a soap line 111) into the water flow to create a soap mix that is supplied to the tank 102. The soap injector 110 is any suitable mechanism or device for injecting/dispensing soap into a water flow, a non-limiting example of which includes an injector/dispenser as produced by Viking LLC, a DEMA Company, located at 512 Industrial Road, Nesquehoning, Pa. 18240, United States of America.

To create bubbles (e.g., soap bubbles), an air manifold 112 is positioned in the trough portion 104 of the tank 102. An air motor 114 is fluidly connected with the air manifold 112 to introduce air through the air manifold 112 and into the soap mix. The air motor 114 is any suitable mechanism or device that is operable for pumping air, a non-limiting example of which includes a 1.5 horse power (HP), 120 Volt Alternating Current (VAC) electric air motor. Upon receiving the soap mix and air, bubbles are created that fill the tank 102 until reaching the overflow lip 106, at which point the bubbles and soap mix flow over the overflow lip 106 and onto a passing vehicle (as depicted in FIG. 7).

Referring again to the air manifold 112, the manifold is any suitable mechanism or device that is operable for receiving air and distributing the air into a fluid (e.g., soap mix), a non-limiting example of which includes a two-inch polyvinyl chloride (PVC) pipe. The air manifold 112 is perforated to allow air that is introduced into the manifold 112 from the air motor 114 to escape into the soap mix. As a non-limiting example, the perforated air manifold 112 is an elongated pipe manifold with a top half and a bottom half, with two rows of holes formed along the top half and a single row of holes formed along the bottom half (e.g., facing downward).

To control the amount of water and soap (and the corresponding soap mix) that is introduced to the tank, a volume control valve 116 is operably connected with the water supply. As a non-limiting example, the volume control valve 116 is a mechanical float valve that is operably connected with water supply inlet to close upon the soap mix exceeding a predetermined level within the tank and to open upon the soap mix falling below the predetermined level.

In operation, as bubbles flow from the overflow lip 106, they fall onto a passing car. However, wind and other air turbulence can sometimes affect the fall of the bubbles. As such, a curtain 118 is attached with the tank 102 to block such air turbulence and prevent the falling bubbles from blowing uncontrollably away from a car surface. For example, the curtain 118 hangs from the tank 102 proximate the overflow lip 106 is formed of any suitably durable and semi-rigid material, a non-limiting example of which includes vinyl. Thus, the curtain 118 allows the bubbles to freely fall, yet blocks wind and other air turbulence.

As noted above, wind and other air turbulence can sometimes affect the fall of the bubbles. To control the flow of water and bubbles from the tank 102, a flow director 119 can be connected with the overflow lip 106 to direct water and bubbles that are flowing over the overflow lip 106. The flow director 119 is any suitable mechanism or device that is capable of directing the flow from the overflow lip 106, a non-limiting example of which includes a pair of pivoting arms. For example, a first pivoting arm 119A and a second pivoting arm 119B are pivotally connected with the overflow lip 106 such that they can independently reside on the overflow lip 106 to narrow a width of flow of fluid flowing over the overflow lip 106. Alternatively, each of the pivoting arms 119A and 119B can pivot away from the overflow lip 106 to increase the width of flow of water (and bubbles, soap mix, etc.) flowing over the overflow lip 106. In other words, the pivoting arms 119A and 119B operate to alter the flow of water by decreasing or increasing the width of the overflow lip 106 (or at least the portion of the overflow lip 106 from which the water can escape and flow).

By narrowing the portion of the overflow lip 106 from which water escapes, the thickness or depth of the water is increased (due the volume of water remaining relatively constant). As such, the sheet of water that now falls from the overflow lip 106 is thicker and less susceptible to air turbulence.

Alternatively, in a situation of low air turbulence, it may be desirable to pivot the pivoting arms 119A and 119B away from the overflow lip 106 to maximize the width of the overflow lip 106 (or the portion of the overflow lip 106 from which water escapes) and, thereby, the width of falling fluid. In this example, the depth of fluid that flows over the overflow lip 106 is thinner (than the circumstance described above), which creates a thinner, yet wider, fall of fluid.

Additionally, a lid 120 is attached with the tank 102 to cover the tank 102 yet allow selective access thereto. For example, the lid 120 is pivotally connected with the tank 102 via hinges 122 or any other suitable connection.

Figures 2A, 2B:
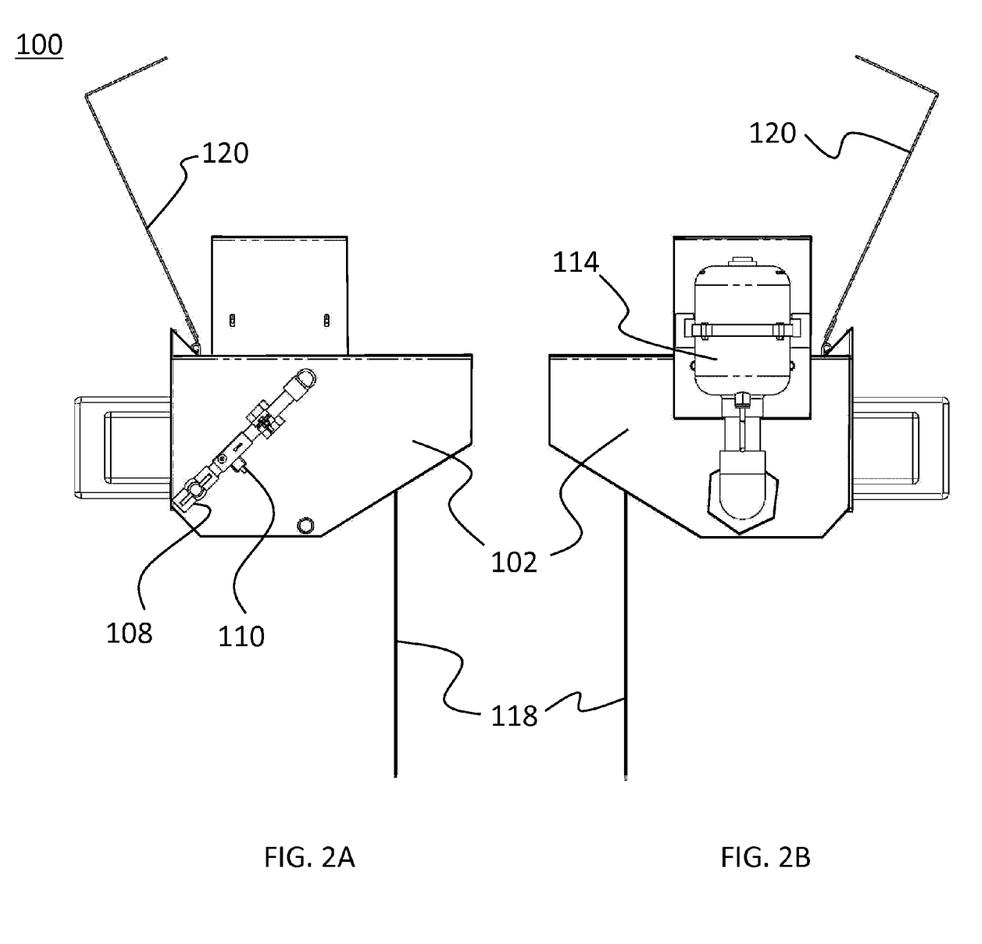
FIG. 2A is a left, side-view illustration of the bubble tank system.
FIG. 2B is a right, side-view illustration of the bubble tank system.

For further understanding, FIG. 2A is a left, side-view illustration of the bubble tank system 100. As shown, the tank 102 includes a hingedly connected lid 120. Also shown are the water supply inlet 108 and the soap injector 110, and the curtain 118 for blocking wind and air turbulence. Alternatively, FIG. 2B is a right, side-view illustration of the tank system 100, depicting the tank 102, lid 120, curtain 118, and air motor 114.

Figure 3:
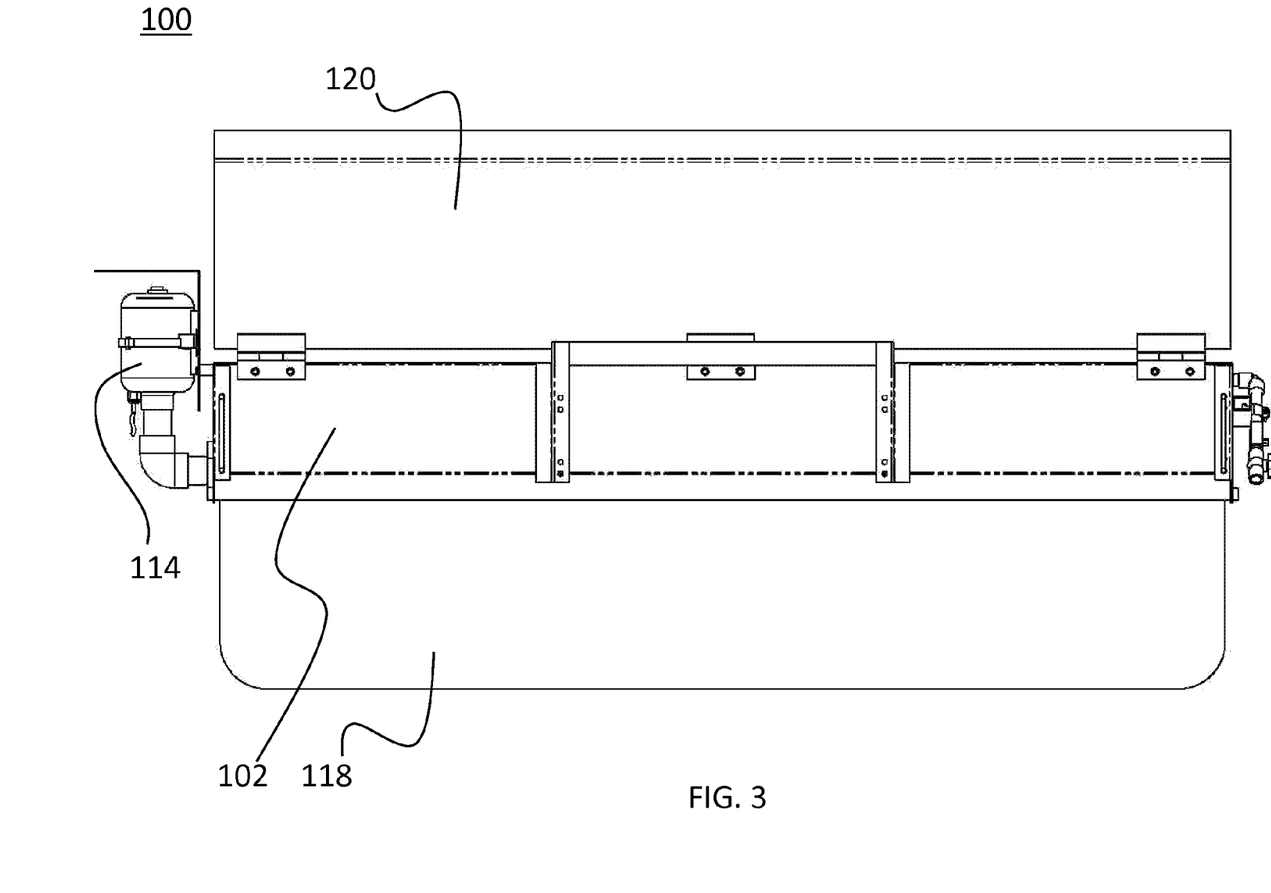
FIG. 3 is a rear-view illustration of the bubble tank system.

Additionally, FIG. 3 is a rear-view illustration of the bubble tank system 100, showing the tank 102, curtain 118, air motor 114, and lid 120.

Figure 4:
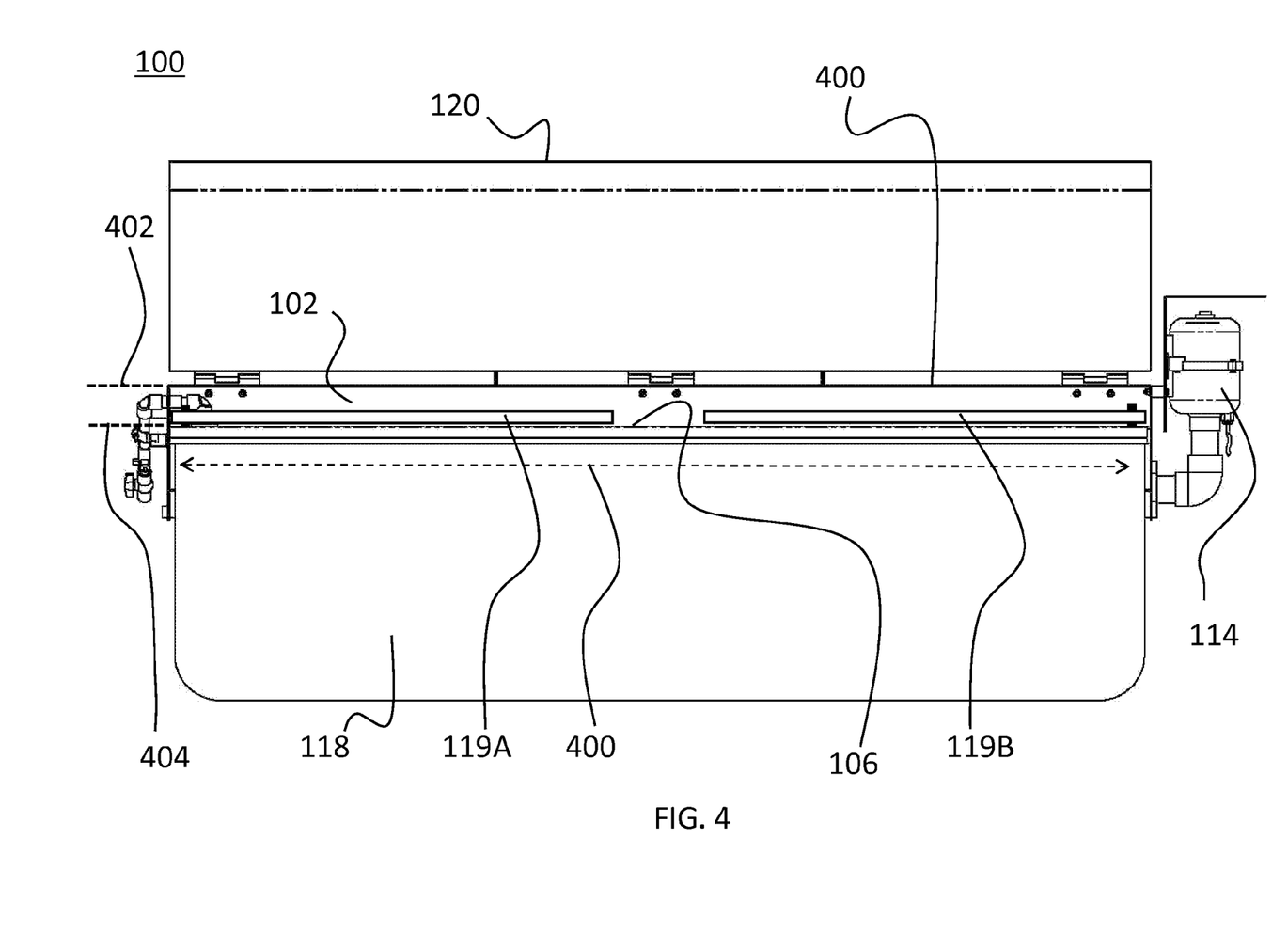
FIG. 4 is a front-view illustration of the bubble tank system.

FIG. 4 provides yet another view of the bubble tank system 100, showing a front-view that illustrates the tank 102, curtain 118, lid 120 and air motor 114. Also shown is the overflow lip 106, which is depicted at a level that is below the top 400 of the tank 102. The tank 102 is bound on all sides by walls that rise to a first level 402 (except at the overflow lip 106). The first level 402 is the top 400 of the tank 102, while the overflow lip 106 is at a second level 404 that is below the top 400 of the tank 102. Water, soap mix, bubbles, etc., that rise above the second level 404 will flow from the tank 102 via the overflow lip 106. Thus, the fluid level in the tank will never reach the first level 402 or the top 400 of the tank 102 as the fluid will always drain via the overflow lip 106.

Pivoting arms 119A and 119B are shown residing on top of the overflow lip 106. As can be appreciated by one skilled in the art and as described above, the flow director (e.g., pivoting arms 119A and 119B) is used to alter the width 400 of the flow that flows over the overflow lip 106. Such width 400 control can be used to manage the thickness (or depth) of the flow of fluid that falls from the tank 102.

Figure 5:
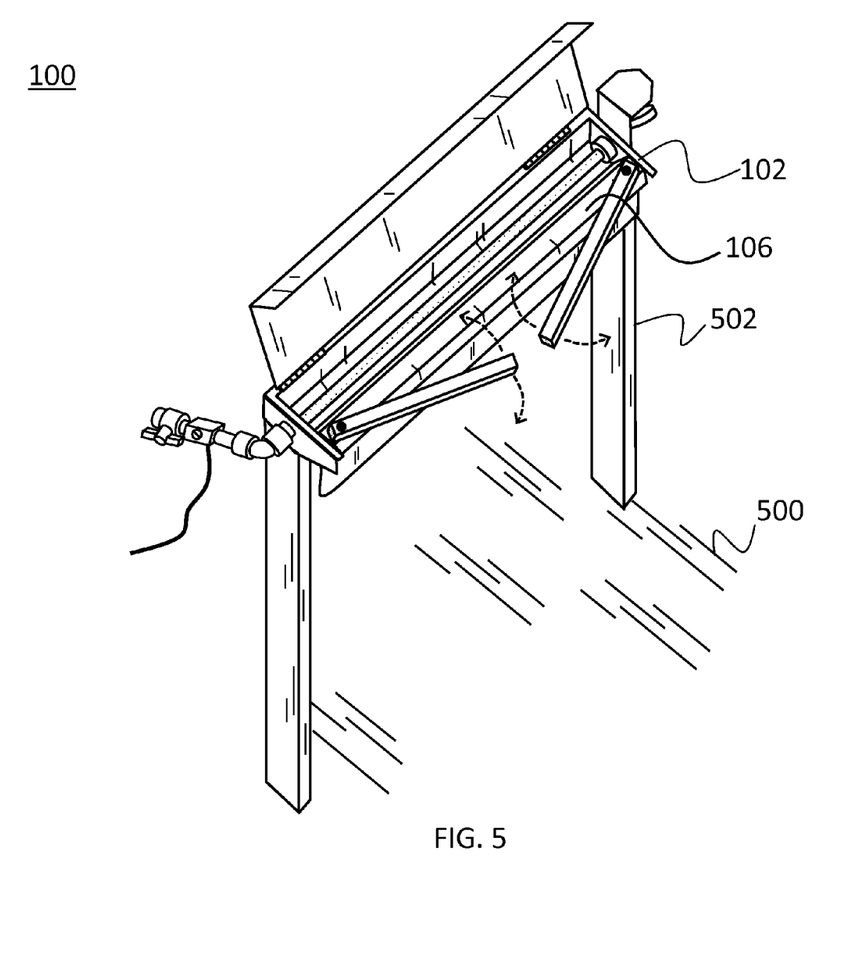
FIG. 5 is an elevated, perspective-view illustration of the bubble tank system and its support system, depicting a lid of the tank system in an open position.

As shown in FIG. 5, the bubble tank system 100 is formed such that the tank 102 is elevated (using a support system 502) above a ground surface 500 to allow a vehicle to pass beneath the tank 102. The support system 502 is any suitable mechanism or device for elevating the tank 102. As a non-limiting example, the support system 502 includes a set of posts connected with the tank 102 (to raise the tank 102 above the ground surface 500). The posts are of any suitable height to allow a vehicle to pass below the tank 102, a non-limiting example of which includes being 10 feet tall. As yet another non-limiting example, the support system 502 includes a set of brackets for attaching the tank 102 to a lateral wall surface such that the tank 102 is elevated sufficiently.

Figure 6:
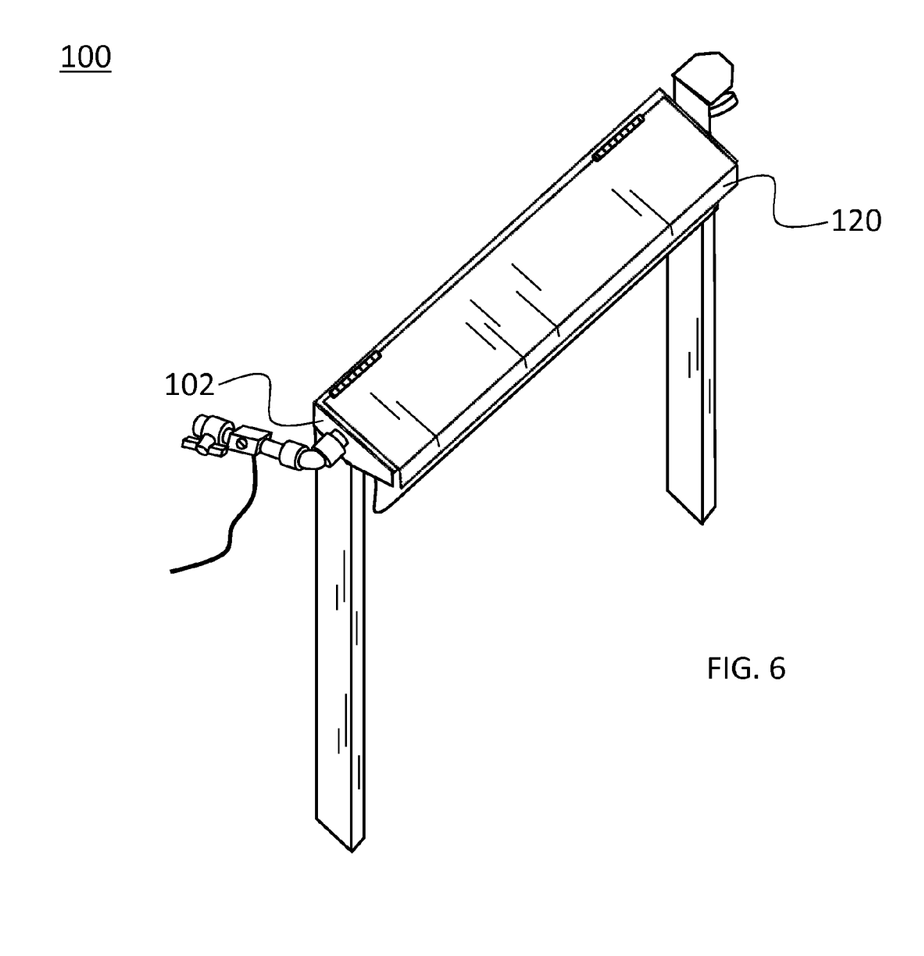
FIG. 6 is an elevated, perspective-view illustration of the bubble tank system and its support system, depicting a lid of the tank system in a closed position.

FIG. 6 depicts the bubble tank system 100 with the lid 120 in a closed position to cover the tank 102.

FIG. 7 depicts the bubble tank system 100 in operation. As shown, the tank 102 is elevated above the ground surface 500 through the support system 502. The tank 102 is elevated sufficiently to allow a vehicle 700 to pass below the tank 102. Upon introducing water, soap, and air to the tank 102, a soap mix is formed with bubbles 702. After reaching the level of the overflow lip (not shown), the soap mix/water (and bubbles 702) flow over the overflow lip and sheet 704 from the tank 102 onto the passing vehicle 700. The tank 102 and overflow lip themselves are of a sufficient size to have a width 706 that is as least as wide as the passing vehicle 700. As a non-limiting example, the width is greater than 48 inches and less than 144 inches. Thus, using the present invention, a vehicle can safely pass below the tank 102 to receive a relatively even distribution of a large volume of soap, water, and bubbles without the need for multiple, high-pressure spray heads.

Figure 8:
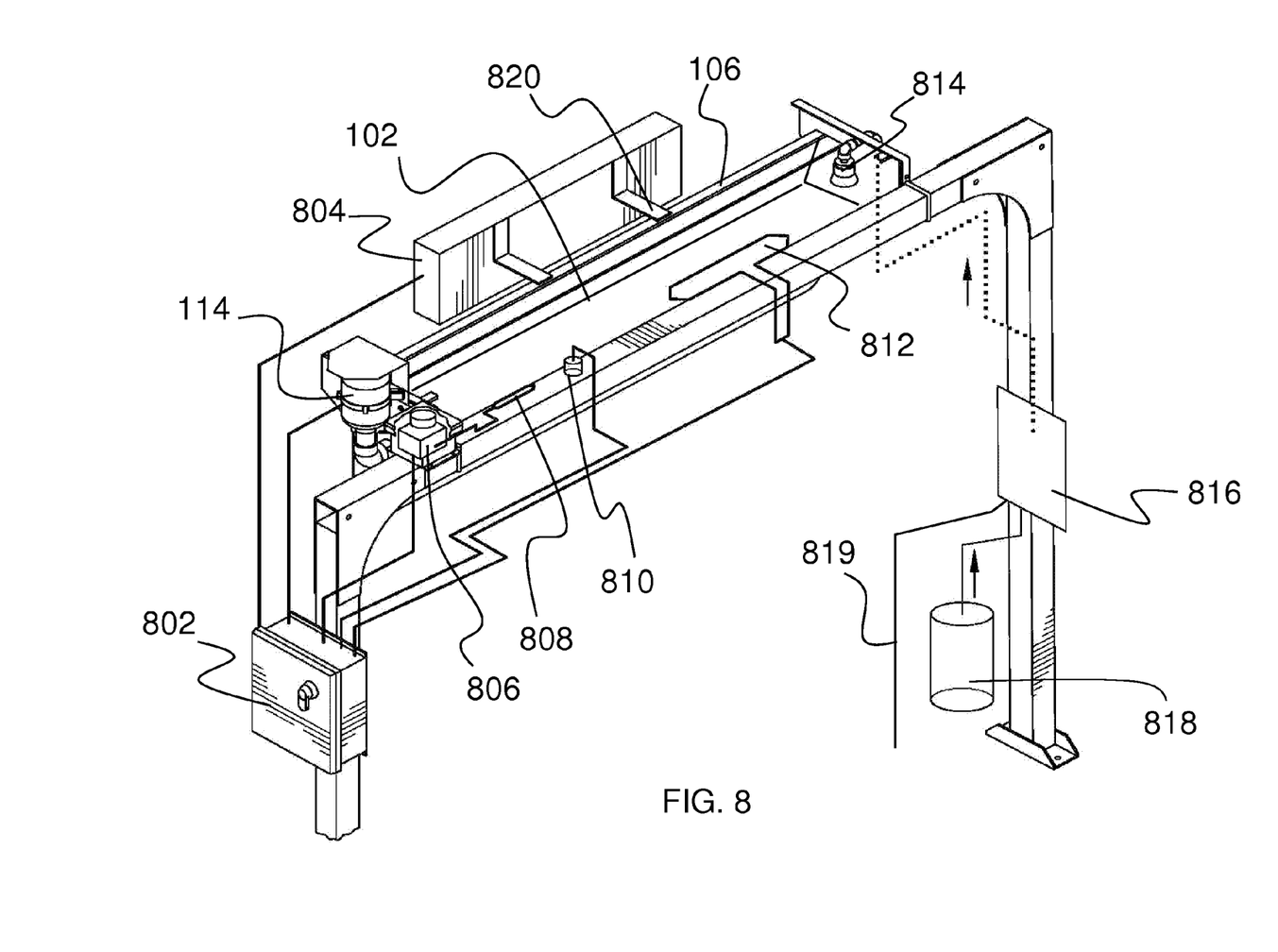
FIG. 8 is an elevated, perspective-view illustration of the bubble tank system according to the principles of the present invention, depicting a light system, an electric control panel and a heating system.

FIG. 8 depicts another aspect of the bubble tank system 100 in which a light system 804 and heating system are included. In this rear-view illustration, several internal components of the tank system 100 are also depicted. Specifically, the heating system is any suitable mechanism or device that is operable for heating the fluid within the tank 102. As a non-limiting example and as shown, the heating system includes a heating element 812, a low liquid level switch 810, a temperature sensor 808 (e.g., switch thermostat capillary tube), an adjustable temperature switch 806, and an electric control panel 802. Also depicted is a mechanical fill float 814, which is described in further detail below.

The electric control panel 802 is operatively connected (via a wired or wireless connection) to the light system 804. While the light system 804 can be self contained, it is desirable to have the light system 804 controlled by a more easily accessible component, such as the control panel 802. The electric control panel 802 controls the features and functions of the light system 804. For example, the light system 804 can be formed to direct light down toward the falling bubbles and, in another aspect, can also be formed to illuminate signage and operate as a sign (such as a flashing light sign). Thus, the electric control panel 802 can control which lights (or colors) operate and what effects they provide, etc. As non-limiting examples, the sign may flash the type of car wash the user is receiving, the wax treatment they are receiving, the name of the business of the carwash, or even a funny quote. The light system 804 is attached to the tank 102 using any suitable mechanism or technique. As a non-limiting example, the light system 804 is bolted to the tank 102 (via a bracket 820) and is positioned slightly forward from the overflow lip 106. Because it is slightly forward from the overflow lip 106, bubbles falling from the overflow lip 106 fall beneath the light system 804 for illumination.

The electric control panel 802 is also operatively connected to the air motor 114. Upon receiving a signal from the electric control panel 802, the electric air motor 114 introduces air through the air manifold 112 and into the soap mix. The chemical (e.g., soap or wax) is located in the chemical container 818 and is optionally mixed with water (introduced via a water line 819) at an injector 816 (e.g., a non-limiting example of such an injector is a Dosatron injector). The fluid is pumped to the tank 102 through the mechanical fill float 814. Bubbles are created that fill the tank 102 until reaching the overflow lip 106, at which point the bubbles fall from the tank 102. It should be understood the chemical can alternatively be wax or any other chemical that is directly provided to the tank with or without the addition of water or any other fluid.

An adjustable temperature switch 806 has a temperature sensor 808 which is located toward the bottom of the tank 102 and is communicatively connected (e.g., via wired or wirelessly) to the electric control panel 802. The temperature sensor 808 senses fluid temperature and automatically controls the heating element 812 inside the tank 102 to turn on (i.e., heat the fluid) or to shut off. As a non-limiting example, the fluid temperature inside the tank 102 may be adjusted to 100 degrees Fahrenheit, or any other desired temperature.

The temperature switch 806 is operatively connected to the electric control panel 802. Once the desired temperature is set in the electric control pane 802, the temperature switch 806 automatically controls the heating element 812. As such, when the temperature of the fluid reaches a pre-determined temperature, the heating element 812 shuts-off. However, if the temperature of the fluid falls below the pre-determined temperature, the heating element 812 turns back on to heat the fluid.

The low liquid level switch 810 is located within the tank 102 to sense when the fluid within the tank is reaching a low level. As a non-limiting example, the low liquid level switch 810 is located toward the bottom of the tank 102. The low liquid level switch 810 is any suitable sensor or switch device that is operable for sensing the level of a fluid. As a non-limiting example, the low liquid level switch 810 is an electric fluid sensing switch that is operatively connected to the electric control panel 802. When the fluid level inside the tank 102 reaches a low level, power to the heating element 812 will shut off in order to prevent over-heating and damage to the system.

Figure 9:
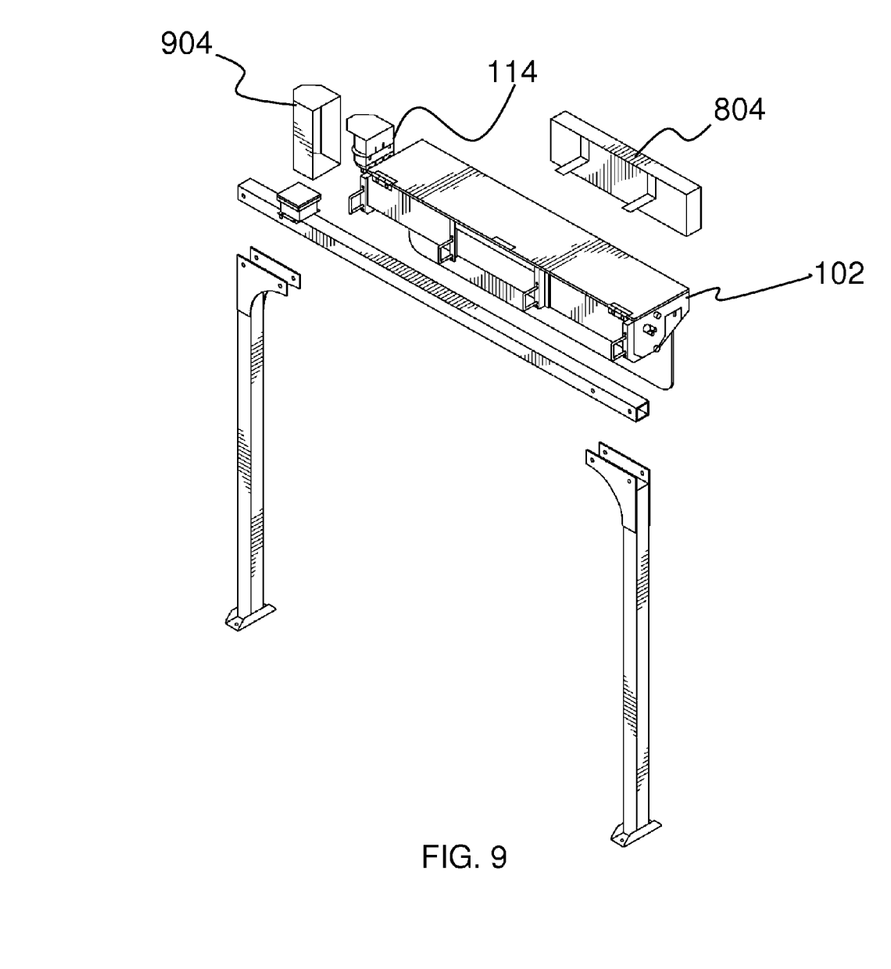
FIG. 9 is an elevated, rear perspective-view illustration of the bubble tank system.

FIG. 9 depicts another view of the bubble tank system 100, with several components detached for illustrative purposes. As shown in FIG. 9, the tank system 100 includes a light system 804 and a tank 102. The air motor cover 904 is also removed to illustrate the air motor 114.

Figure 10:
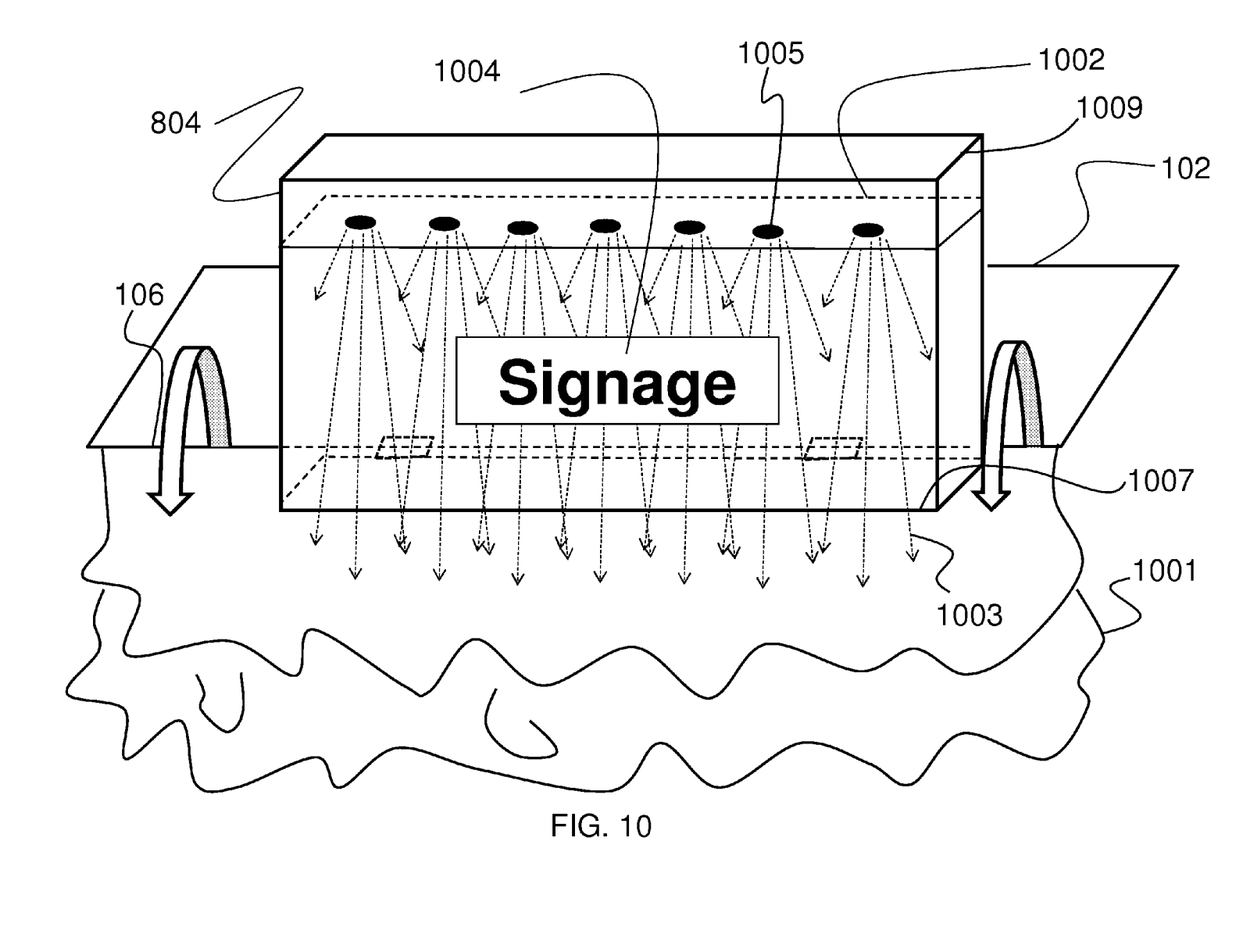
FIG. 10 is a front-view illustration of the light system and bubble tank system.

As depicted in FIG. 10, the light system 804 is attached to the tank 102. Importantly, the light system 804 is attached to the tank 102 in any suitable manner as to illuminate the falling fluid 1001 (e.g., bubbles). As a non-limiting example, the light system 804 is attached with the overflow lip 106 of the tank 102 such that a portion of the light 1003 emitted from the light system 804 is projected downward to illuminate falling bubbles as they fall from the tank 102 and below the light system 804.

The light system 804 includes any suitable illumination mechanism or device for generating and directing light 1003 toward the falling fluid 1001. As a non-limiting example, the light system 804 includes a light element 1002 (e.g., light bar) with a plurality of LEDs 1005 (or light bulbs, etc.) that generate light 1003.

The lights (or LEDs 1005) can be provided in any desired color and in any display pattern. As a non-limiting example, the light element 1002 includes multi-colored LEDs 1005 to illuminate the fluid in different colors. As noted above and as another non-limiting example, the multi-colored LEDs 1005 are directed toward the falling fluid 1001 so that when the falling fluid 1001 is illuminated by the multi-colored LEDs 1005, the falling fluid 1001 simulates the appearance of falling lava. Thus, as a non-limiting example, the multi-colored LEDs 1005 may shine a red or a combination of different colored lights (e.g., red, orange, yellow, and blue) onto the falling fluid 1001 to simulate the color of lava or to create a desired mood (e.g., such as blue for peaceful, or flashing yellow and white for chaotic lightening effects, etc.).

Further, the LEDs 1005 may be provided or illuminated in any number according to the desired effect. As a non-limiting example, there may be as little as one light element 1005 (each with 20 LEDs 1005) or as many as twenty light elements 1005 (each with 20 LEDs 1005).

As noted above, the light system 804 can also be formed to include signage 1004. Thus, the light elements 1005 can be positioned at any suitable location to illuminate the fluid 1001 and, optionally, the signage 1004. As can be appreciated by one skilled in the art, the light elements 1005 can be positioned toward the bottom 1007 of the light system 804 to illuminate the fluid 1001. However, in an alternative aspect, the light system 804 includes an open or translucent bottom 1007 portion and the light elements 1005 are positioned within the light system 804 and toward a top portion 1009. Further, in this aspect, a front portion 1011 of the light system 804 can be formed with translucent signage 1004. Thus, in this aspect, the light 1003 provided by the light elements 1005 passes through the front portion 1011 to illuminate the signage 1004 in addition to the falling fluid 1001.

As noted above, the signage 1004 can be used to provide any desired message to a passing vehicle (and its passengers). As a non-limiting example, the signage 1004 is a translucent plastic with a combination of words or a phrase, or may include any other desired message, such as the name of the carwash. As another non-limiting example, the light system 804 can be configured such that the light elements 1005 flash (or stay constantly illuminated) to illuminate the word "lava."

Figure 11:
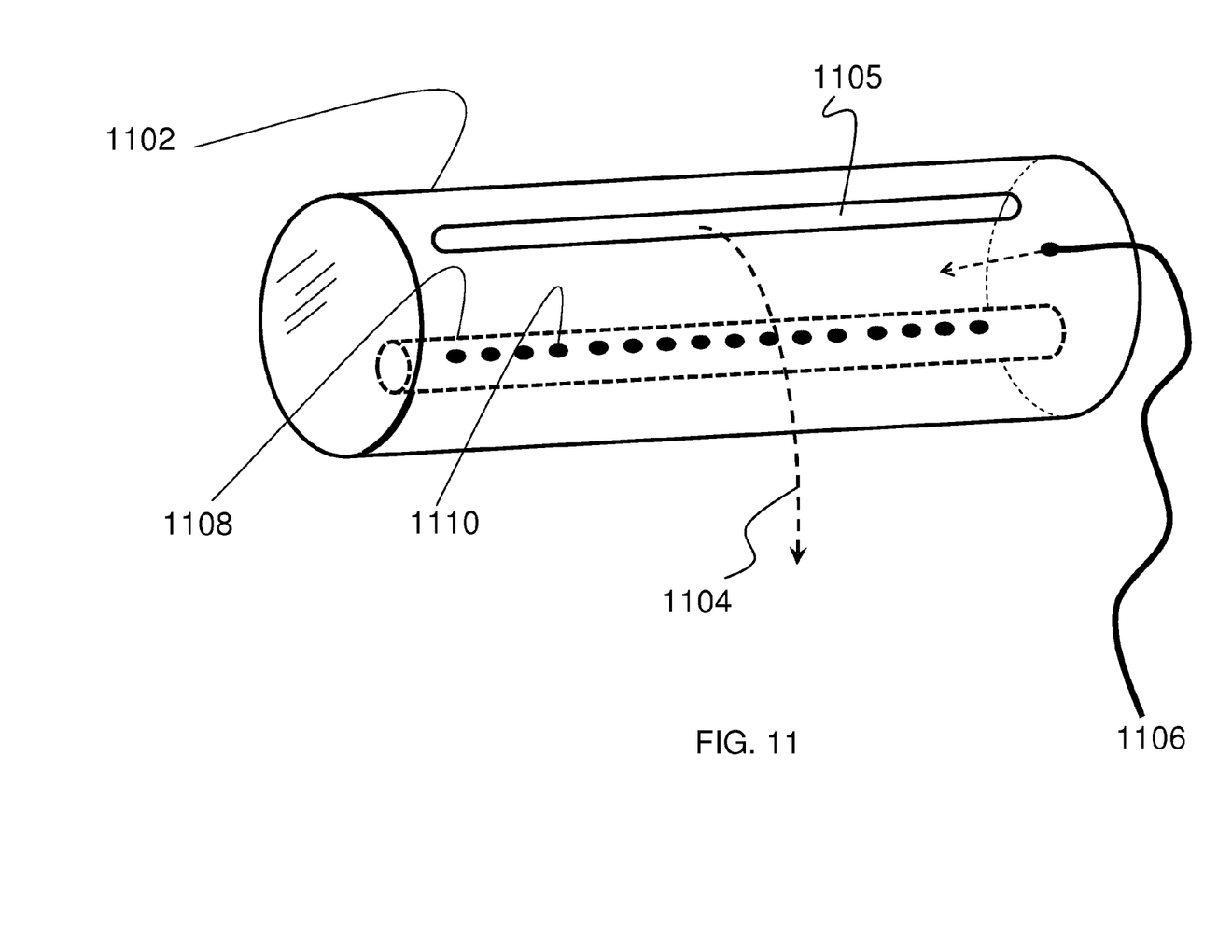
FIG. 11 is an illustration of the bubble tank system, depicting an aspect where the tank is cylindrical.

It should be understood that although the system 100 (as illustrated in FIG. 1) is depicted as having a traditional trough-shaped tank 102, the invention is not intended to be limited thereto as the tank can be formed in a suitably shape. As a non-limiting example and as depicted in FIG. 11, the tank can be provided as a cylindrical-shaped tank 1102. In this aspect, the cylindrical-shaped tank 1102 has a fluid inlet 1106 to provide fluid (e.g., water and soap, etc.) to the tank 1102. Also included is an inner air manifold 1108 with several air holes 1110. The inner air manifold 1108 delivers air into the fluid to generate bubbles (using an air motor as described above). Once the cylindrical shaped tank 1102 is filled with the fluid and/or bubbles, the fluid 1104 will overflow through an opening 1105 and fall onto a passing car in a controlled manner.

Another variation of the tank is shown in FIGS. 12A and 12B. More specifically, FIG. 12A provides an external view of the tank 1202, while FIG. 12B provides a cross-sectional view of the tank 1202 as depicted in FIG. 12A. As shown, the tank 1202 can be formed to include two or more smaller troughs 1206A and 1206B, each operable to collect a fluid (e.g., water and/or soap, etc.) that is introduced into the tank 1202 from a fluid supply inlet 108.

Additionally, in another aspect, each trough 1206A and 1206B optionally includes an air manifold 1208 to generate bubbles as described above (i.e., via air generated through the connected air motors 114). In operation, the fluid supply inlet 108 receives water (and/or soap, etc.) from an external fluid source and introduces the fluid into the tank 1202 where it gathers in the trough portions 1206A and 1206B.

Importantly, each trough portion 1206A and 1206B includes an overflow lip 1210A and 1210B. Positioned between the trough portions 1206A and 1206B is a drop opening 1212. Thus, as the fluid gathers in the trough portions 1206A and 1206B and reaches the overflow lips 1210A and 1210B, the fluid flows over the overflow lips 1210A and 1210B and falls from the drop opening 1212 onto a passing vehicle. This is further illustrated in FIG. 13, which depicts the flow of the fluid 1001 as it flows from the trough portions 1206A and 1206B and falls from the drop opening 1212.

Figure 12:
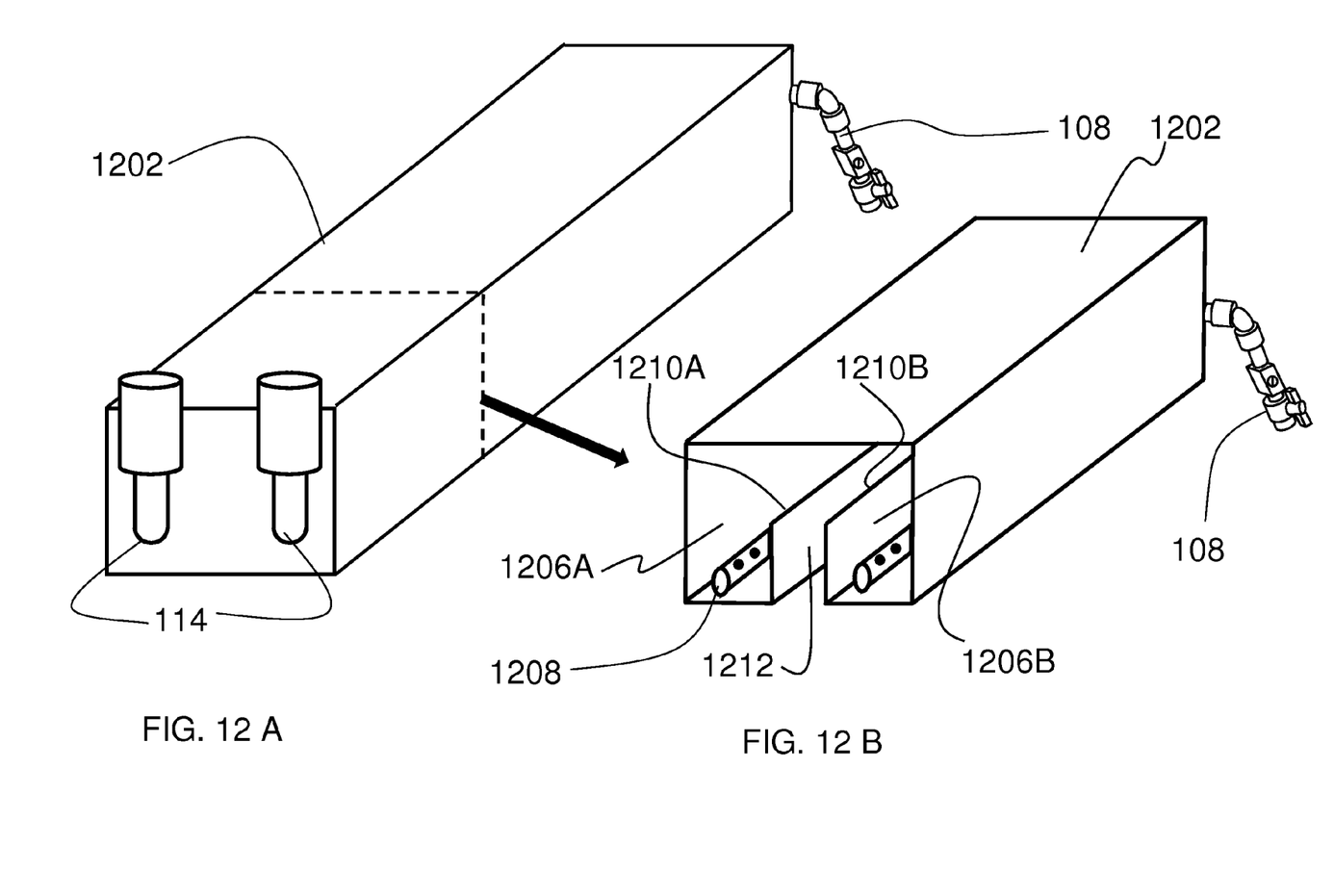
FIG. 12A is an illustration of the bubble tank system, depicting an aspect where the fluid falls from below the bubble tank system.
FIG. 12B is a cross-sectional view illustration of the bubble tank system as depicted in FIG. 12A.
Figure 13:
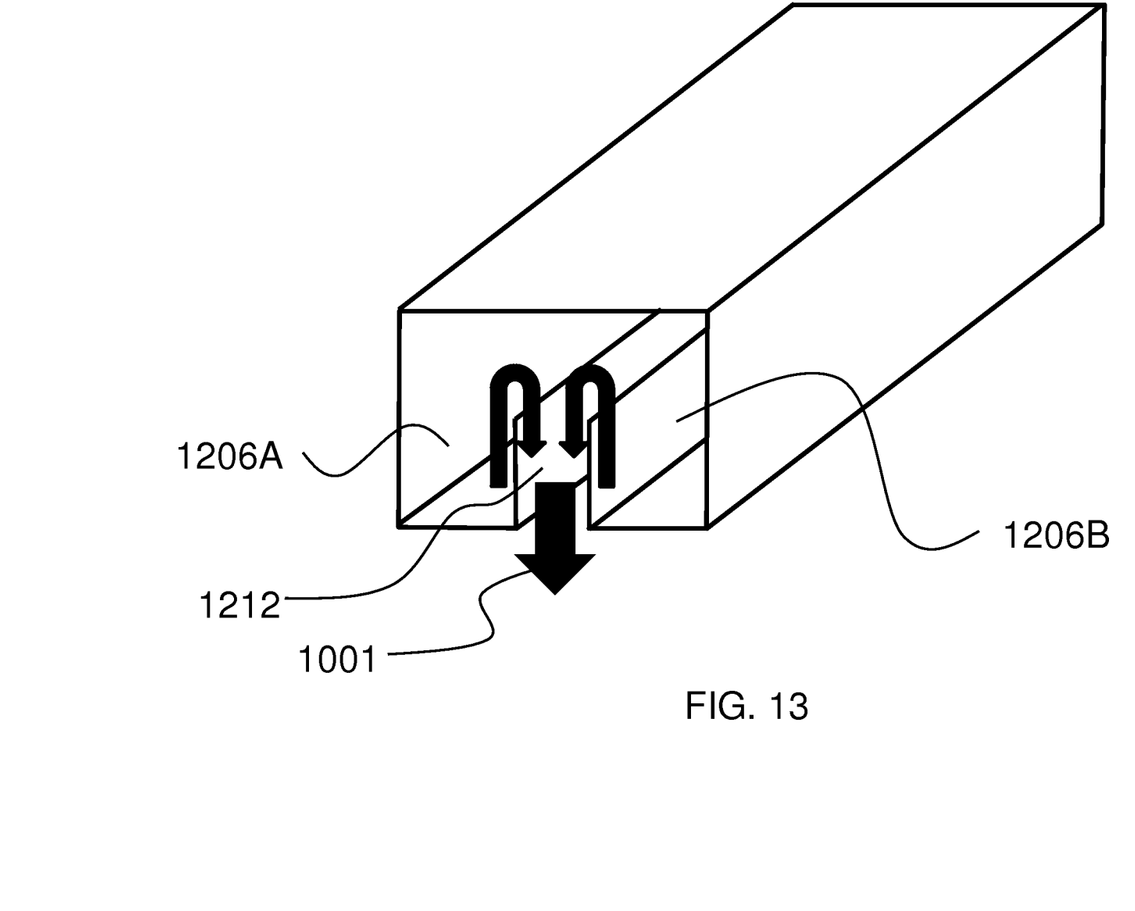
FIG. 13 is an interior-view illustration of the bubble tank system depicted in FIG. 12A to illustrate the flow of fluid as it falls from the bubble tank system.

It should be understood that the alternative tank variations as depicted in FIGS. 12A through 13 are provided as non-limiting examples of tank shapes that can be incorporated into the bubble tank system as described herein. Thus, although all of the various components described above with respect to FIGS. 1 through 10 are not illustrated in FIGS. 12A through 13, it should be understood that the components can be similarly incorporated into all tank variations. Further, it should also be noted that although the tank system is described as having an air manifold, heater, light system, etc., it is not intended to be limited thereto as it can be similarly formed with any or all of the relevant components as desired. Thus, in its most simple aspect, the tank system simply includes a tank (in any desired shape) and a water inlet to drop water alone, or alternatively, a wax inlet alone. In another aspect, the tank system can be formed to include all or any number of the components described herein (or any combination thereof), such as the soap injector, air manifold, heater, etc.

As such, it should be understood that the specific examples provided herein are a non-limiting example according to the principles of the present invention and that other embodiments and/or aspects are conceived by the present invention. Thus, as can be appreciated, the present invention is not intended to be limited to the embodiments presented, but is to be accorded the widest scope consistent with the principles and novel features disclosed herein.

What is claimed is:

1. A tank system for dropping water onto a passing vehicle, comprising:
    a tank having a fluid exit;
    a support system connected with the tank for elevating the tank above a ground surface to allow a vehicle to pass beneath the tank;
    a fluid supply inlet fluidly connected with the tank for receiving a fluid flow from an external fluid source and introducing fluid into the tank, which thereafter fails from the tank; and
    a light system attached with the tank, the light system having a light element to direct light toward a fluid as it falls from the tank, whereby after receiving fluid, the fluid falls from the tank onto a passing vehicle, such that upon falling from the tank, the fluid is illuminated by the light system.

2. The tank system as set forth in claim 1, further comprising:
    a soap injector fluidly connected with the fluid supply inlet for injecting soap into the fluid flow to create a soap mix that is supplied to the tank;
    an air manifold positioned in the tank; and
    an air motor fluidly connected with the air manifold to introduce air through the air manifold and into the soap mix, whereby upon receiving the soap mix and air, bubbles are created within the tank that fall onto a passing vehicle.

3. The tank system as set forth in claim 2, wherein the light element includes a plurality of light emitting diodes (LEDs) such that light emitted from the LEDs is directed toward the fluid falling from the tank.

4. The tank system as set forth in claim 3, wherein the light system includes a front signage.

5. The tank system as set forth in claim 4, wherein the light element includes multi-colored LEDs that are directed downward to illuminate a falling fluid, such that when the falling fluid is illuminated by the multi-colored LEDs, the falling fluid simulates the appearance of falling lava.

6. The tank system as set forth in claim 5, further comprising a heating system for heating the fluid within the tank.

7. The tank system as set forth in claim 6, wherein the heating system further comprises:
    a heating element to heat the fluid;
    a temperature sensor to sense the temperature of the fluid;
    a temperature switch to control the operability of the heating element; and
    a low liquid level switch to turn off the heating element if the fluid in the tank falls below a predetermined threshold.

8. The tank system as set forth in claim 7, further comprising a curtain attached with the tank such that it hangs from the tank proximate the fluid exit.

9. The tank system as set forth in claim 8, further comprising a mechanical float valve operably connected with the fluid supply inlet, the float valve adapted to close upon the fluid exceeding a predetermined level within the tank and to open upon the fluid falling below the predetermined level.

10. The tank system as set forth in claim 9, wherein the tank includes two troughs with a drop opening positioned therebetween, such that each trough includes an air manifold.

11. The tank system as set forth in claim 1, further comprising a heating system for heating the fluid within the tank.

12. The tank system as set forth in claim 11, wherein the heating system further comprises;
    heating element to heat the fluid;
    a temperature sensor to sense the temperature of the fluid;
    a temperature switch to control the operability of the heating element; and
    a low liquid level switch to turn off the heating element if the fluid in the tank falls below a predetermined threshold.

13. The tank system as set forth in claim 12, wherein the external fluid source includes wax, such that the fluid introduced to the tank includes wax, whereby when in the tank, the heating system heats the wax to generate a hot wax that falls from the tank onto a passing vehicle.

14. The tank system as set forth in claim 1, wherein the tank includes two troughs with a drop opening positioned therebetween, such that each trough includes an air manifold.

* * * * *